(12) United States Patent
Jun et al.

(10) Patent No.: US 11,252,308 B2
(45) Date of Patent: Feb. 15, 2022

(54) CAMERA MODULE AND IMAGING APPARATUS INCLUDING THE SAME

(71) Applicant: SAMSUNG ELECTRONICS CO., LTD., Suwon-si (KR)

(72) Inventors: Hyunsu Jun, Seongnam-si (KR); Kihyun Kwon, Seoul (KR); Seunghak Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/336,931

(22) Filed: Jun. 2, 2021

(65) Prior Publication Data

US 2022/0021794 A1 Jan. 20, 2022

(30) Foreign Application Priority Data

Jul. 14, 2020 (KR) ........................ 10-2020-0086978

(51) Int. Cl.
*H04N 5/225* (2006.01)
(52) U.S. Cl.
CPC ....... *H04N 5/22521* (2018.08); *H04N 5/2253* (2013.01); *H04N 5/2258* (2013.01)
(58) Field of Classification Search
CPC . H04N 5/22521; H04N 5/2253; H04N 5/2258
See application file for complete search history.

(56) References Cited

U.S. PATENT DOCUMENTS

| 8,605,211 | B2 | 12/2013 | Webster et al. | |
|---|---|---|---|---|
| 9,377,363 | B2 * | 6/2016 | Boulanger | .......... H01L 27/1462 |
| 10,175,112 | B1 * | 1/2019 | Kuperman | ............ G01J 5/0215 |
| 10,379,315 | B2 | 8/2019 | Kim et al. | |
| 10,382,698 | B2 | 8/2019 | Sharma et al. | |
| 2006/0097180 | A1 * | 5/2006 | Spartiotis | .................. G01T 1/17 |
| | | | | 250/370.13 |
| 2012/0026337 | A1 * | 2/2012 | Boulanger | ................ G01J 1/44 |
| | | | | 348/164 |
| 2018/0267390 | A1 | 9/2018 | Kim et al. | |
| 2019/0041909 | A1 | 2/2019 | Pakula et al. | |
| 2019/0369678 | A1 | 12/2019 | Park et al. | |
| 2019/0377236 | A1 | 12/2019 | Jang et al. | |
| 2021/0185254 | A1 * | 6/2021 | Osawa | .................. A61B 1/128 |

FOREIGN PATENT DOCUMENTS

| KR | 10-0604547 B1 | 7/2006 |
|---|---|---|
| KR | 10-1783773 B1 | 10/2017 |

* cited by examiner

*Primary Examiner* — Mekonnen D Dagnew
(74) *Attorney, Agent, or Firm* — Sughrue Mion, PLLC

(57) ABSTRACT

A camera module is provided. The camera module includes a substrate; a first camera disposed on the substrate and configured to generate a first image based on a first optical signal; a second camera disposed on the substrate and configured to generate a second image based on a second optical signal; a power management integrated circuit disposed on the substrate and configured to generate a plurality of voltages based on an external power voltage received from an external power supply and provide the plurality of voltages to the first camera and the second camera; a metal fixing member coupled to the first camera and the second camera; and a thermal interface material disposed between the power management integrated circuit and the metal fixing member along a direction perpendicular to an upper surface of the substrate.

20 Claims, 16 Drawing Sheets

CAMERA MODULE AND IMAGING APPARATUS INCLUDING THE SAME

CROSS-REFERENCE TO RELATED APPLICATION

This application is based on and claims priority from Korean Patent Application No. 10-2020-0086978, filed on Jul. 14, 2020, in the Korean Intellectual Property Office, the disclosure of which is incorporated herein by reference in its entirety.

BACKGROUND

1. Field

Methods, apparatuses and systems consistent with example embodiments relate to a camera module and an imaging apparatus including the same.

2. Related Art

Recently, as camera functions of an electronic device such as a smart phone have been increasing, electronic device that include multiple cameras, each of which includes an image sensor, have been developed. Accordingly, the complexity of power wires increases, and power supply environments are diversified and vary, resulting in variable power quality. In addition, the image sensor consumes an increasing amount of power because of high resolution and an increasing number of functions. To remove the variability of power quality, a power management integrated circuit supplying power to the image sensor may be mounted on a printed circuit board (PCB) of a camera module. However, when the power management integrated circuit is mounted on the camera module, image quality may degrade due to heat emitted from the power management integrated circuit.

SUMMARY

Example embodiments provide a camera module having improved radiation performance and image quality, and an imaging apparatus including the camera module.

According to one or more example embodiments, a camera module includes a substrate; a first camera disposed on the substrate and configured to generate a first image based on a first optical signal; a second camera disposed on the substrate and configured to generate a second image based on a second optical signal; a power management integrated circuit disposed on the substrate, and configured to generate a plurality of voltages based on an external power voltage received from an external power supply and provide the plurality of voltages to the first camera and the second camera; a metal fixing member coupled to the first camera and the second camera; and a thermal interface material disposed between the power management integrated circuit and the metal fixing member along a direction perpendicular to an upper surface of the substrate.

According to one or more example embodiments, a camera module includes a first substrate; a first camera disposed on the first substrate and configured to generate a first image based on a first optical signal; a first power management integrated circuit disposed on the first substrate, and configured to generate a first power voltage based on a first external power voltage received from an external power supply and provide the first power voltage to the first camera; a metal fixing member coupled to the first camera; and a first thermal interface material disposed between the first power management integrated circuit and the metal fixing member along a direction perpendicular to an upper surface of the first substrate.

According to one or more example embodiments, an imaging apparatus includes: a first camera module configured to generate a first image; a power supply configured to provide a power voltage to the first camera module; and a processor configured to receive the first image from the first camera module. The first camera module includes: a substrate; a first camera disposed on the substrate and including a first lens and a first image sensor; a connector electrically connected to the substrate and configured to receive the power voltage from the power supply and transmit the first image to the processor; a power management integrated circuit disposed on the substrate, and configured to generate a plurality of voltages based on the power voltage and provide the plurality of voltages to the first image sensor; a metal frame surrounding and coupled to the first camera; and a thermal interface material disposed between the power management integrated circuit and the metal frame along a direction perpendicular to an upper surface of the substrate.

BRIEF DESCRIPTION OF THE DRAWINGS

The above and other objects and features will become more apparent from the following description of example embodiments with reference to the accompanying drawings in which.

DETAILED DESCRIPTION

Hereinafter, example embodiments will be described in detail with reference to the attached drawings.

Figure 1A:
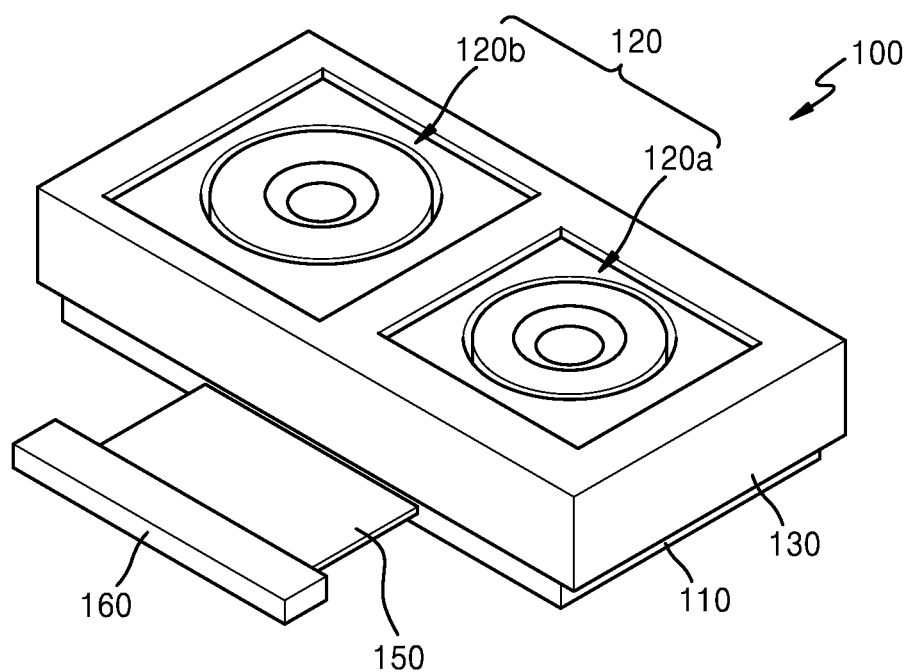
FIG. 1A is a perspective view of a camera module according to an example embodiment.
Figure 1B:
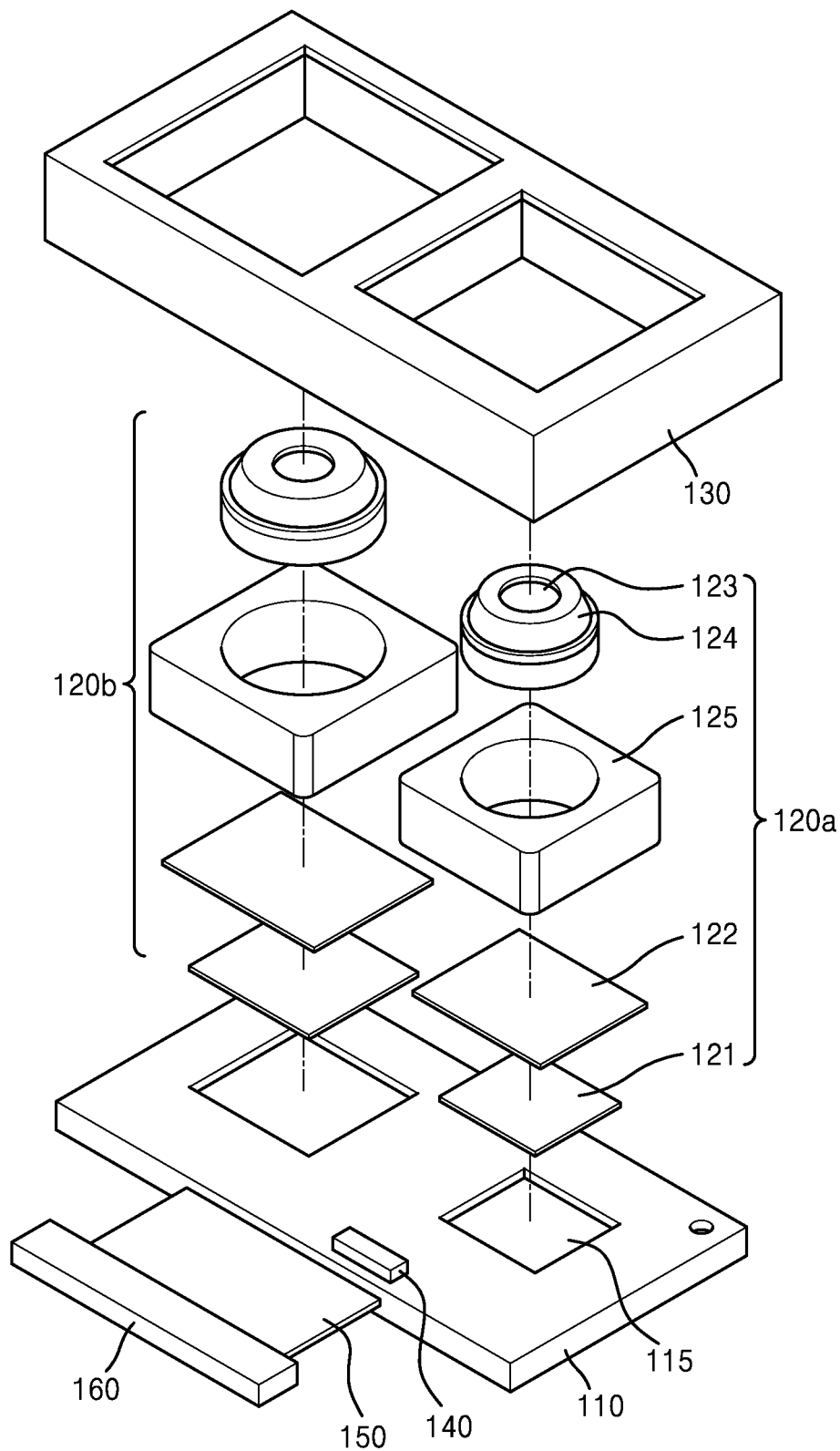
FIG. 1B is an exploded perspective view of a camera module according to an example embodiment.

FIG. 1A is a perspective view of a camera module according to an example embodiment, and FIG. 1B is an exploded perspective view of a camera module according to an example embodiment.

A camera module 100 according to an example embodiment may be included in an electronic apparatus capturing images or having an optical sensing function. For example, the camera module 100 may be included in an electronic apparatus such as a digital still camera, a digital video camera, a smart phone, a wearable device, an Internet of Things (IoT) device, a tablet Personal Computer (PC), a Personal Digital Assistant (PDA), a Portable Multimedia Player (PMP), or a navigation device. Also, the camera module 100 may be a component of a vehicle, furniture, manufacturing equipment, a door, various measurement devices, or the like and may be included in an electronic apparatus. The term "module" used in the present specification may be a component integrally formed or a minimum unit or part of the component performing one or more functions.

Referring to FIGS. 1A and 1B, the camera module 100 may include a substrate 110, at least one camera 120, for example, a first camera 120a and a second camera 120b, a fixing member 130, a power management integrated circuit 140, a connection member 150, and a connector 160. Moreover, the at least one camera 120, for example, the first camera 120a, may include an image sensor 121, an IR filter 122 (an infrared shield filter), a lens 123 (an optical lens), a lens barrel 124, and an actuator 125. In the present specification, the camera 120 may indicate an assembly including the lens 123 and the image sensor 121 and may be referred to as an imaging unit.

Referring to FIGS. 1A and 1B, the camera module 100 may include the first camera 120a and a second camera 120b mounted on one substrate 110, and the camera module 100 including multiple cameras may be referred to as a multi-camera module. However, example embodiments are not limited thereto. The camera module 100 may include one camera or at least three cameras, and multiple cameras may be mounted on different substrates.

The image sensor 121 of each of the first camera 120a and the second camera 120b may receive an optical signal collected through the lens 123, and the image sensor 121 may generate images (or image data) based on the received optical signal. For example the optical signal may include light that is incident on the image sensor 121. Features of a first image generated by the first camera 120a may differ from those of a second image generated by the second camera 120b. For example, a viewing angle of the lens 123 included in the first camera 120a may be different from a viewing angle of the lens 123 included in the second camera 120b. For example, the viewing angle of the lens 123 of the second camera 120b may be relatively greater than the viewing angle of the lens 123 of the first camera 120a (a wide-angle lens). The first camera 120a may generate an image having a first viewing angle, and the second camera 120b may generate an image having a second viewing angle that is greater than the first viewing angle. As another example, features, for example, a color filter array structure, a resolution, etc., of the image sensor 121 of the first camera 120a may differ from those of the image sensor 121 of the second camera 120b, and features of the first image may differ from those of the second image accordingly.

The lens barrel 124 may include the lens 123. In an example embodiment, the lens barrel 124 may include lenses. The lens barrel 124 may substantially have a cylindrical shape and may the lens 123 may be provided along an optical axis.

An optical signal, which penetrates the IR filter 122 from among optical signals collected through the lens 123, may be incident to the image sensor 121. The IR filter 122 may block an infrared component of the received optical signal. Accordingly, noise in the image data generated due to the infrared component may be removed.

The image sensor 121 may convert the received optical signal into an electrical signal. The image sensor 121 may convert the electrical signal from analog to a digital image signal. The image sensor 121 may be realized as a Charge Coupled Device (CCD) or a Complementary Metal Oxide Semiconductor (CMOS).

The image sensor 121 may include a pixel array that receives an optical signal. The pixel array may include pixels arranged in a matrix, and each pixel may include a photoelectric conversion device. For example, the photoelectric conversion device may include a photodiode, a photo transistor, a photo gate, a pinned photodiode, or the like.

The actuator 125 may be connected to the lens barrel 124 and may move the lens barrel 124, that is, the lens 123, on an optical axis of the lens 123 and/or a surface perpendicular to the optical axis. Accordingly, the first camera 120a may provide additional functions, for example, Auto Focusing (AF), an Optical Image Stabilizer (OIS), IRIS, and the like, for the improvement in image quality.

In an example embodiment, the first camera 120a may further include a housing that forms an exterior, and the actuator 125 may be integrally formed with the housing. FIG. 1B shows that each of the first camera 120a and the second camera 120b includes the actuator 125, but either one or any combination of the first camera 120a and the second camera 120b may not include the actuator 125.

The image sensor 121 and the actuator 125 may be mounted on the substrate 110. For example, the image sensor 121 may be mounted in an accommodation groove 115 in the substrate 110. In an example embodiment, the image sensor 121 may be mounted on the substrate 110 in a wire-bonding manner.

Also, the power management integrated circuit 140 may be mounted on the substrate 110. The power management integrated circuit 140 may be realized as a semiconductor chip including a power control circuit. The power management integrated circuit 140 may generate voltages used in the first camera 120a and the second camera 120b based on a power voltage (hereinafter, referred to as a reference power voltage) received from the outside through the connector 160 and may provide the generated voltages to the first camera 120a and the second camera 120b. For example, the voltages may include a power voltage provided to a digital block (e.g., a digital circuit of the image sensor 121) and a power voltage provided to an analog block (e.g., an analog circuit of the image sensor 121) included in each of the first camera 120a and the second camera 120b. The power management integrated circuit 140 may also receive a ground voltage through the connector 160 and may provide the ground voltage to the first camera 120a and the second camera 120b.

In an example embodiment, the power management integrated circuit 140 may be packaged by using a protection member. For example, at least one surface, for example, an upper surface, of the power management integrated circuit 140 may be covered by a shield can. The shield can may include a metallic material. Accordingly, the power management integrated circuit 140 may be protected from static electricity, physical impact, and the like.

The connector 160 may electrically connect the camera module 100 to a main board of an electronic apparatus including the camera module 100. The connector 160 may be electrically connected to the substrate 110. In an example embodiment, the connector 160 of FIG. 1 may be connected to the substrate 110 through the connection member 150, and, for example, the connection member 150 may be realized as a flexible printed circuit board (FPCB). However, example embodiments are not limited thereto, and in another example embodiment, the connector 160 may be directly connected to the substrate 110.

The connector 160 may include pins (or pads) that receive/transmit signals or voltages (e.g., power voltages). A reference power voltage may be received through some of the pins, and the connector 160 may provide the reference power voltage to the power management integrated circuit 140 through wire lines patterned to the substrate 110 and the connection member 150. Control signals may be received through the other pins to control the camera module 100.

Wires, which are used to transmit signals that are exchanged between the first camera 120*a*, the second camera 120*b*, the power management integrated circuit 140, and the connector 160, may be patterned on the substrate 110. The substrate 110 may be realized as a PCB.

The fixing member 130 (or a frame of the camera module) may be connected (coupled) to the first camera 120*a* and the second camera 120*b*, and may align the first camera 120*a* and the second camera 120*b*. For example, the fixing member 130 may fix the first camera 120*a* and the second camera 120*b* to a certain point of a substrate (or a main substrate) of an electronic apparatus on which the camera module 100 is mounted. The fixing member 130 may include metal or a metallic material. As shown in FIGS. 1A and 1B, the fixing member 130 may surround each of the first camera 120*a* and the second camera 120*b*. FIGS. 1A and 1B show that part of the fixing member 130 is disposed between the first camera 120*a* and the second camera 120*b*, but example embodiments are not limited thereto. The fixing member 130 may surround the first camera 120*a* and the second camera 120*b*.

The power management integrated circuit 140 and the fixing member 130 (e.g., a portion of the fixing member 130) may be stacked in a direction perpendicular to the substrate 110, and in this case, as described below, a thermal interface material (e.g., a TIM of FIG. 2B) may be disposed between the power management integrated circuit 140 and the fixing member 130.

Figure 2A:
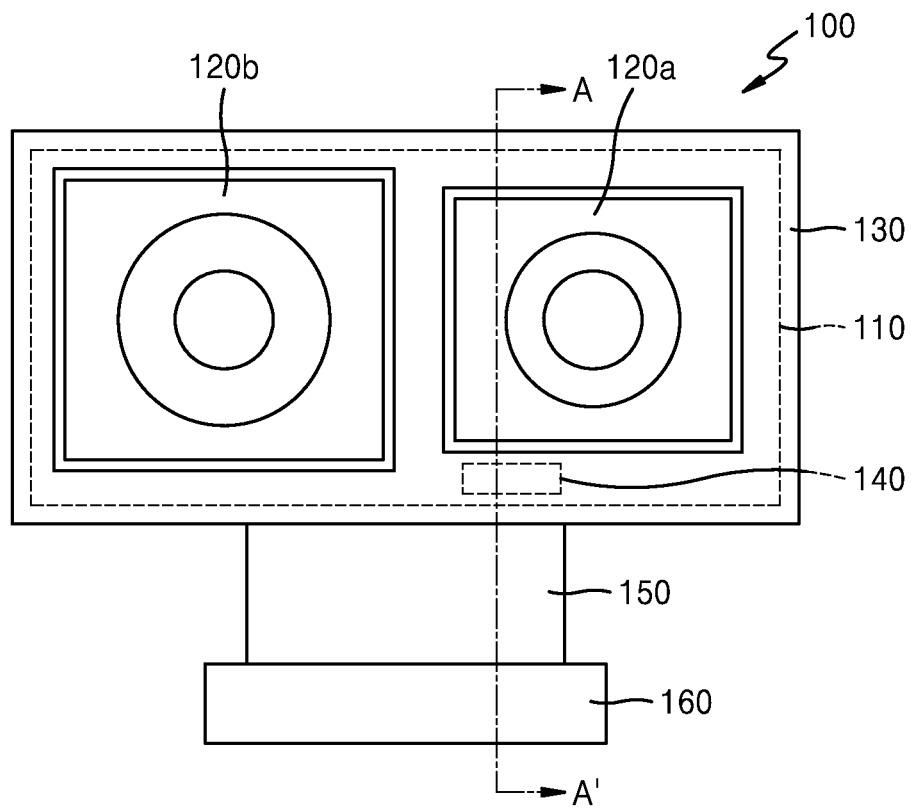
FIG. 2A is a front view of a camera module according to an example embodiment.
Figure 2B:
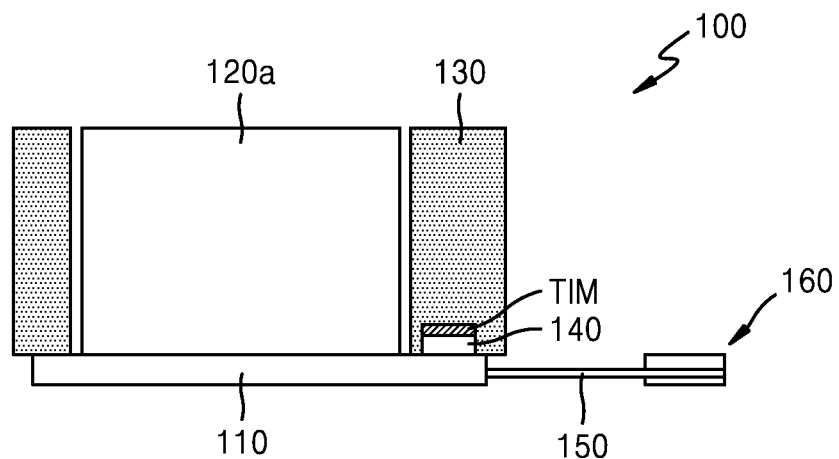
FIG. 2B is a cross-sectional view of a camera module according to an example embodiment.

FIG. 2A is a front view of a camera module according to an example embodiment, and FIG. 2B is a cross-sectional view of a camera module according to an example embodiment. FIG. 2B may be a cross-sectional view taken along a line A-A' of FIG. 2A.

Referring to FIGS. 2A and 2B, the camera module 100 may include the substrate 110, the first camera 120*a*, the second camera 120*b*, the fixing member 130, the power management integrated circuit 140, the connection member 150, and the connector 160.

The first camera 120*a* and the second camera 120*b* may be arranged on the substrate 110 side by side, and the connection member 150 may be connected to a side surface of the substrate 110, for example, a side surface facing the first camera 120*a* and the second camera 120*b*. FIG. 2A shows that the connection member 150 is connected to a central portion of the above side surface of the substrate 110, but example embodiments are not limited thereto. The connection member 150 may be connected to a right portion of the side surface (a portion relatively close to the first camera 120*a*) or a left portion of the side surface (a portion relatively close to the second camera 120*b*) of the substrate 110.

The power management integrated circuit 140 may be disposed on the substrate 110 to be close to one of the first camera 120*a* and the second camera 120*b*. For example, a size of the first camera 120*a* may be less than that of the second camera 120*b*, and the power management integrated circuit 140 may be close to the first camera 120*a*.

As shown in FIG. 2B, the upper surface of the power management integrated circuit 140 may be covered by the fixing member 130. In other words, a portion of the fixing member 130 may be stacked on an upper portion of the power management integrated circuit 140 in the direction perpendicular to the substrate 110. The thermal interface material TIM may be disposed between the power management integrated circuit 140 and the fixing member 130. In an example embodiment, the TIM may directly contact the power management integrated circuit 140 and/or the fixing member 130.

The TIM may be realized as thermal grease, a reactive compound, an elastomer, an adhesive film, or the like. The adhesive film may include a conductive material, for example, a polymer in which aluminum, copper, etc., are mixed. For example, the TIM may be spread on the upper surface of the power management integrated circuit 140 or part of the fixing member 130 (that is, a portion facing the upper surface of the power management integrated circuit 140), or a TIM of a film type may be attached thereto.

The TIM may decrease a thermal resistance and may increase a thermal bond between the power management integrated circuit 140 and the fixing member 130. Accordingly, heat generated in the power management integrated circuit 140 may be easily transmitted to the fixing member 130 through the TIM and may be discharged to the outside through the fixing member 130.

As described above, the camera module 100 according to an example embodiment may include the power management integrated circuit 140. When the heat generated in the power management integrated circuit 140 increases an internal temperature of the camera module 100, the quality of images generated in the image sensor 121 may deteriorate. For example, dark shading may be generated in an image according to a difference in dark currents that are locally generated in an array of the image sensor 121.

However, in the camera module 100 according to an example embodiment, the TIM may be disposed between the power management integrated circuit 140 and the fixing member 130, and the heat generated in the power management integrated circuit 140 may be quickly discharged to the outside. Therefore, a temperature increase of the camera module 100 and the quality deterioration of the images may be prevented.

Figure 3:
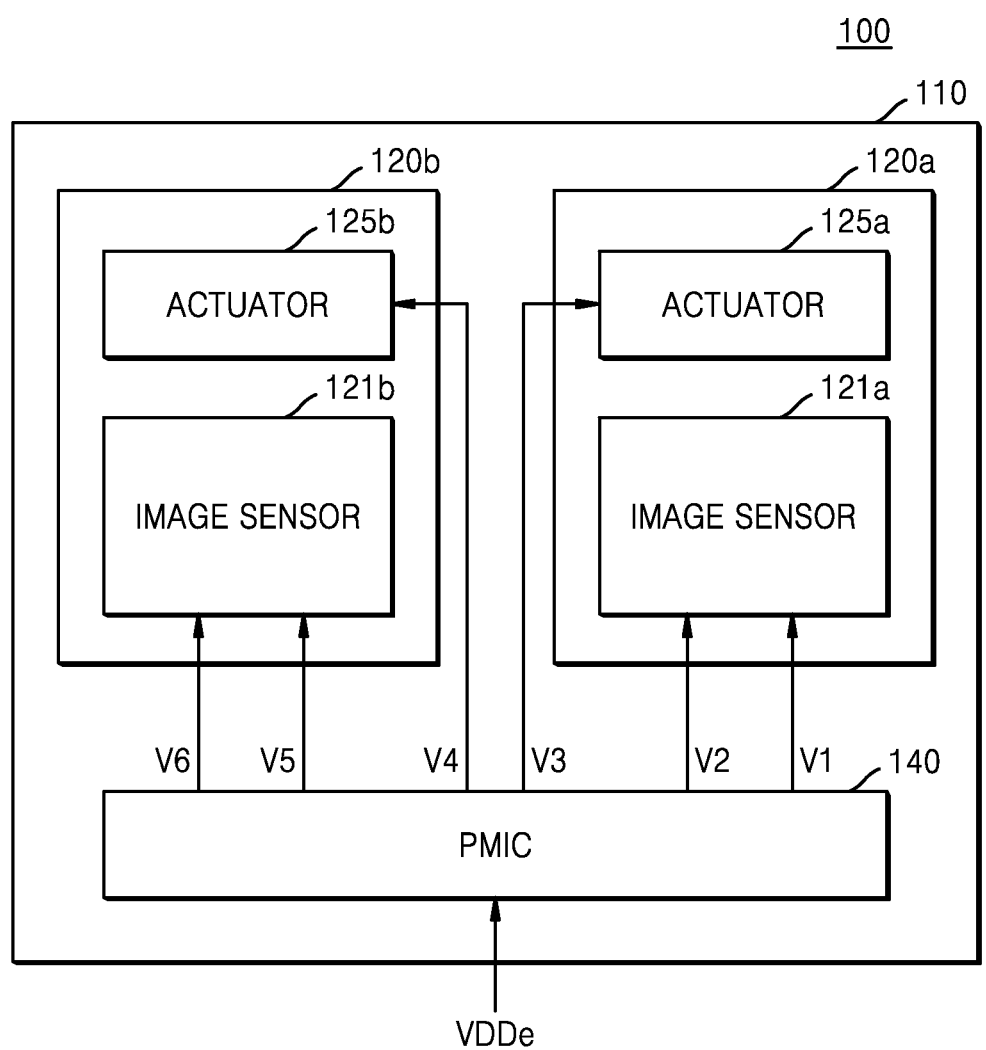
FIG. 3 is a schematic block diagram of a camera module according to an example embodiment.

FIG. 3 is a schematic block diagram of a camera module according to an example embodiment. FIG. 3 shows some components that are included in cameras and driven according to a received voltage.

Referring to FIG. 3, the camera module 100 includes the first camera 120*a*, the second camera 120*b*, and the power management integrated circuit 140 disposed on the substrate 110.

The first camera 120*a* may include an image sensor 121*a* and an actuator 125*a*, and the second camera 120*b* may include an image sensor 121*b* and an actuator 125*b*. In an example embodiment, the second camera 120*b* may not include the actuator 125*b*.

The power management integrated circuit 140 may generate power voltages, for example, first to sixth voltages V1 to V6, according to an external power voltage VDDe received from the outside and may provide the power voltages to the first camera 120a and the second camera 120b. The power management integrated circuit 140 may provide the first to sixth voltages V1 to V6 to the first camera 120a and the second camera 120b through wires patterned on the substrate 110.

For example, the power management integrated circuit 140 may provide the first to third voltages V1 to V3 to the first camera 120a and the fourth to sixth voltages V4 to V6 to the second camera 120b. However, this is an example. Types and the number of voltages generated by the power management integrated circuit 140 may vary, and one or more of the first to sixth voltages V1 to V6 may be commonly provided to the first camera 120a and the second camera 120b.

The image sensor 121a of the first camera 120a may use the first voltage V1 and the second voltage V2 as power voltages, and the actuator 125a may use the third voltage V3 as a power voltage. In an example embodiment, one of the first voltage V1 and the second voltage V2 may be provided to a digital circuit of the image sensor 121a, and the other one may be provided to an analog circuit of the image sensor 121a.

The image sensor 121b of the second camera 120b may use the fifth voltage V5 and the sixth voltage V6 as power voltages, and the actuator 125b may use the fourth voltage V4 as a power voltage. In an example embodiment, one of the first voltage V1 and the second voltage V2 may be provided to a digital circuit of the image sensor 121b, and the other one may be provided to an analog circuit of the image sensor 121b.

Figure 4:
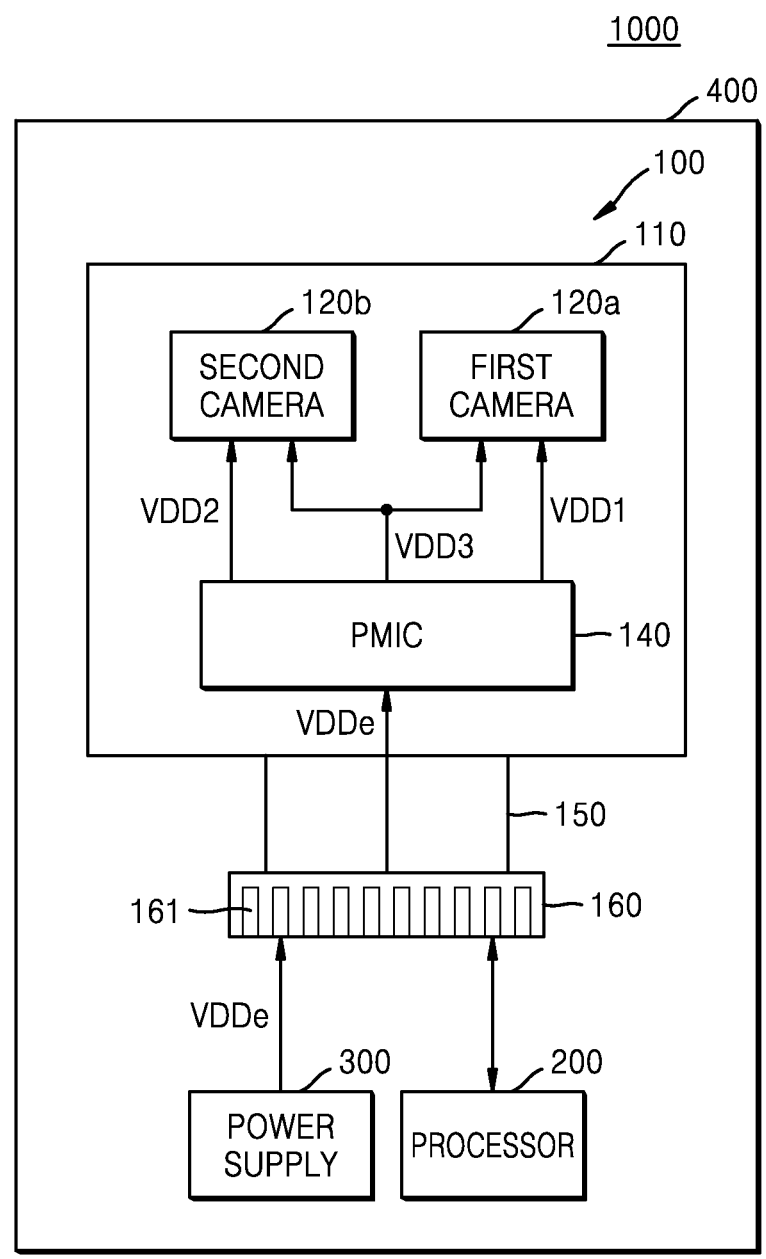
FIG. 4 is a schematic block diagram of an imaging apparatus including a camera module, according to an example embodiment.

FIG. 4 is a schematic block diagram of an imaging apparatus including a camera module, according to an example embodiment.

Referring to FIG. 4, an imaging apparatus 1000 may include the camera module 100, a processor 200, and a power supply 300. The processor 200 and the power supply 300 may be mounted on a main board 400 of the imaging apparatus 1000. The camera module 100 may be mounted on the main board 400 or connected to the main board 400 through the connector 160. In an example embodiment, the fixing member (130 of FIGS. 1A, 1B, 2A, and 2B) may fix the camera module 100 to a certain location of the main board 400.

The processor 200 may be a Central Processing Unit (CPU), a microprocessor, an ARM processor, an X86 processor, a Microprocessor without Interlocked Pipeline Stages (MIPS) processor, a graphics processing unit (GPU), a general-purpose GPU, or any other processor configured to execute program commands stored in a memory.

The processor 200 may provide the camera module 100 with control signals for controlling the camera module 100. The control signals may be received by the camera module 100 through the connector 160. For example, the control signal may include an enable signal, etc., for controlling configuration registers of the first camera 120a, the second camera 120b, and the power management integrated circuit 140 or operations thereof.

The power supply 300 may be a battery or a main power control circuit (a main power management integrated circuit) of the imaging apparatus 1000. A power voltage, for example, the external power voltage VDDe, which is output from the power supply 300, may be provided to the power management integrated circuit 140 through the connector 160.

The camera module 100 may be connected to other components, for example, the power supply 300 and the processor 200, of the imaging apparatus 1000 through the connector 160 and may receive/transmit signals or voltages through pins 161 of the connector 160.

The power management integrated circuit 140 may generate power voltages VDD1, VDD2, and VDD3 used in the first camera 120a and the second camera 120b according to the external power voltage VDDe received from the outside through the connector 160 and may provide the generated power voltages VDD1, VDD2, and VDD3 to the first camera 120a and the second camera 120b. In an example embodiment, the third power voltage VDD3 may be commonly provided to the first camera 120a and the second camera 120b. For example, the third power voltage VDD3 may be a power voltage applied to the digital circuit.

When the power management integrated circuit 140 is disposed outside the camera module 100, for example, on the main board 400, the power voltages VDD1, VDD2, and VDD3 generated in the power management integrated circuit 140 may be received by the camera module 100 through the connector 160, and while paths, via which the power voltages VDD1, VDD2, and VDD3 are transmitted, increase, and the power voltages VDD1, VDD2, and VDD3 are transmitted, noise may be generated in the power voltages VDD1, VDD2, and VDD3. However, in another camera module 100 according to an example embodiment, the paths, via which the power voltages VDD1, VDD2, and VDD3 are transmitted, may decrease as the power management integrated circuit 140 is included in the camera module 100, the noise may decrease while the power voltages VDD1, VDD2, and VDD3 are transmitted.

Figure 5A:
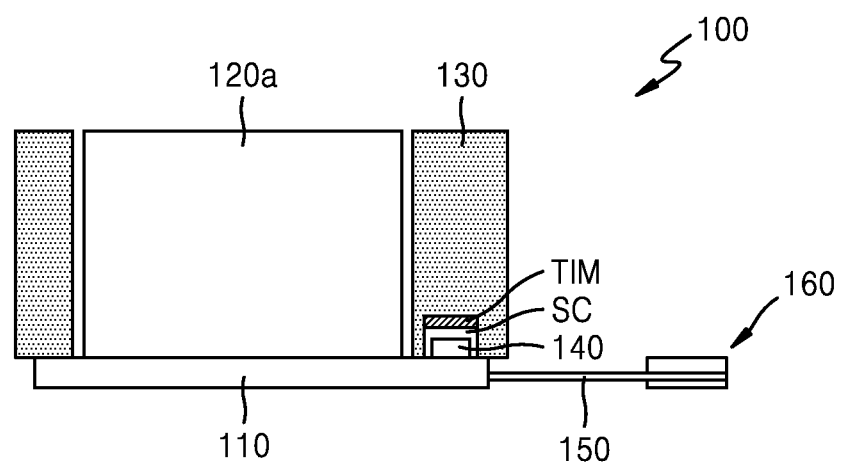
FIGS. 5A and 5B are cross-sectional views of another camera module according to example embodiments.
Figure 5B:
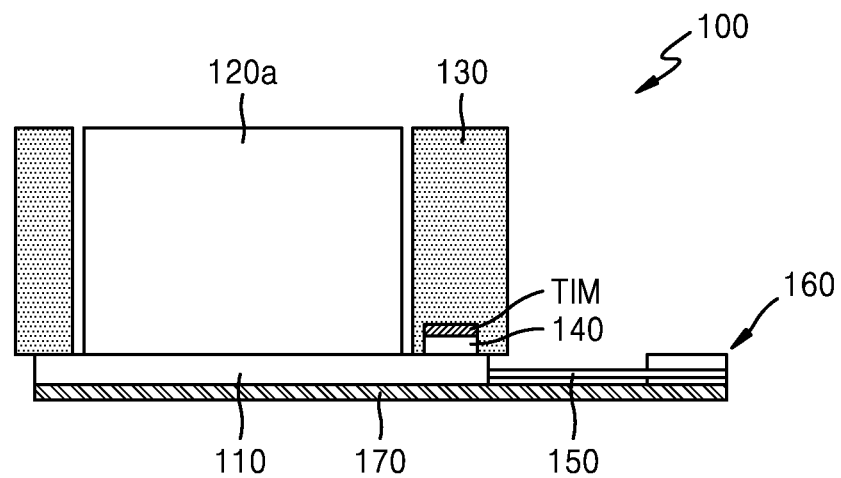

FIGS. 5A and 5B are cross-sectional views of camera modules according to example embodiments. FIGS. 5A and 5B may be modified examples of the camera module of FIG. 2A.

Referring to FIG. 5A, the power management integrated circuit 140 may be covered by the protection member, for example, a shield can SC, and the TIM may be disposed between the shield can SC and the fixing member 130. The TIM may directly contact an upper surface of the shield can SC and/or the fixing member 130.

Referring to FIG. 5B, a radiation film 170 (or a radiation sheet) may be attached to a lower surface of the substrate 110 and may extend to a lower surface of the connector 160. The radiation film 170 may include graphite, an alloy including copper, or the like. However, example embodiments are not limited thereto. The radiation film 170 may include various materials having great radiation performance.

Heat generated in the power management integrated circuit 140 may be discharged through the fixing member 130, transmitted to the radiation film 170 through the substrate 110, and discharged through the radiation film 170.

The descriptions provided with reference to FIGS. 5A and 5B may be applied to the camera module 100 described with reference to FIGS. 1A to 4 and camera modules 100a, 100b, 100c, 100d, 100e and 100f according to one or more example embodiments described below.

Figure 6A:
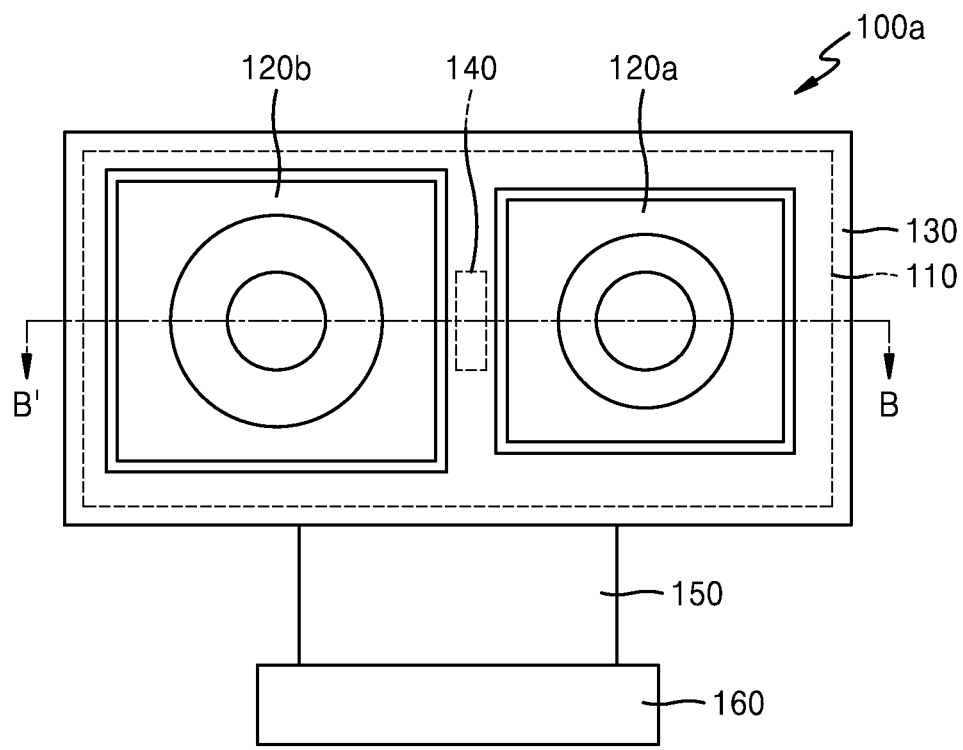
FIG. 6A is a front view of a camera module according to an example embodiment.
Figure 6B:
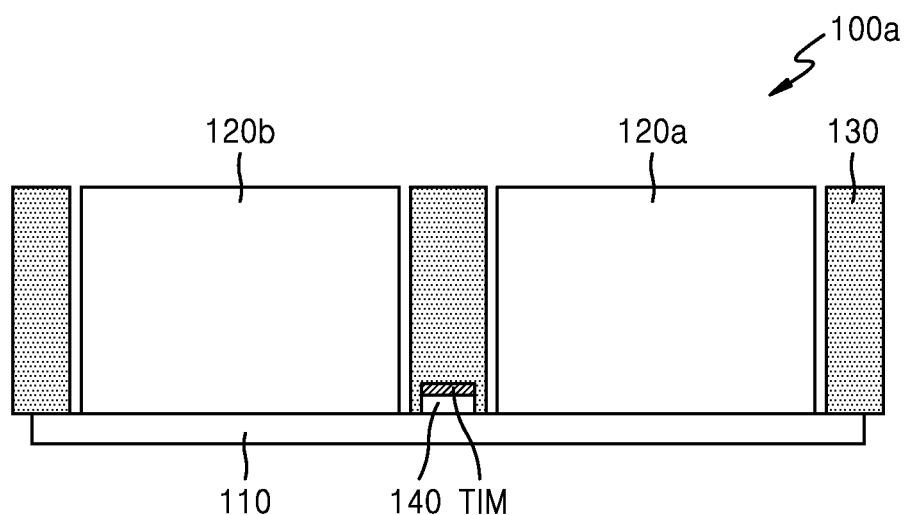
FIG. 6B is a cross-sectional view of a camera module according to an example embodiment.

FIG. 6A is a front view of a camera module according to an example embodiment, and FIG. 6B is a cross-sectional view of a camera module according to an example embodiment. FIG. 6B may be a cross-sectional view taken along a line B-B' of FIG. 6A.

Referring to FIGS. 6A and 6B, the camera module 100a may include the substrate 110, the first camera 120a, the second camera 120b, the fixing member 130, the power management integrated circuit 140, the connection member 150, and the connector 160.

On the substrate 110, the power management integrated circuit 140 may be disposed between the first camera 120a and the second camera 120b. The TIM may be disposed on the upper surface of the power management integrated circuit 140.

The fixing member 130 may surround each of the first camera 120a and the second camera 120b, and the TIM may be disposed between the power management integrated circuit 140 and a portion of the fixing member 130, for example, a portion between the first camera 120a and the second camera 120b. In an example embodiment, the TIM may directly contact the upper surface of the power management integrated circuit 140 and/or part of the fixing member 130. In an example embodiment, referring to FIG. 5A, the power management integrated circuit 140 may be covered by the protection member, and the TIM may be disposed between the protection member and part of the fixing member 130.

Figure 7A:
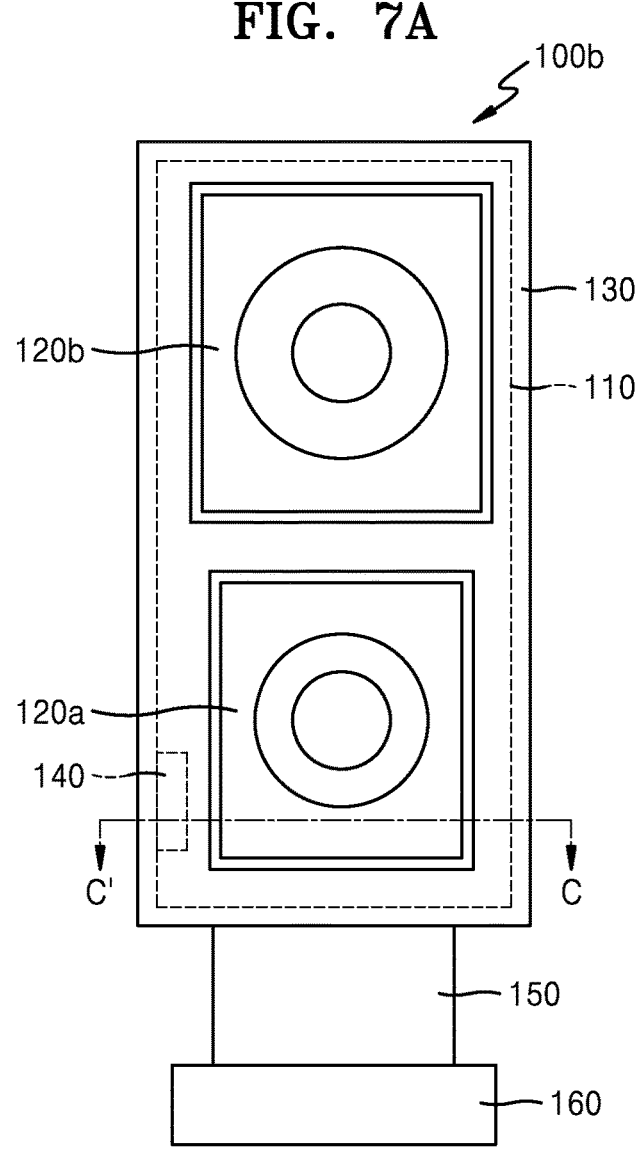
FIG. 7A is a front view of a camera module according to an example embodiment.
Figure 7B:
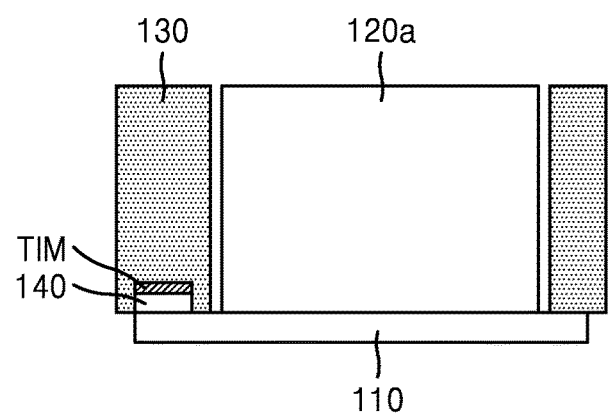
FIG. 7B is a cross-sectional view of a camera module according to an example embodiment.

FIG. 7A is a front view of a camera module 100b according to an example embodiment, and FIG. 7B is a cross-sectional view of a camera module according to an example embodiment. FIG. 7B may be a cross-sectional view taken along a line C-C' of FIG. 7A.

Referring to FIGS. 7A and 7B, the camera module 100b may include the substrate 110, the first camera 120a, the second camera 120b, the fixing member 130, the power management integrated circuit 140, the connection member 150, and the connector 160.

The first camera 120a and the second camera 120b may be disposed on the substrate 110 side by side, and the connection member 150 may be connected to a side surface of the substrate 110, for example, a side surface that is opposite to a side surface of the first camera 120a.

The power management integrated circuit 140 may be disposed on the substrate 110, for example, may be disposed adjacent to one of the first camera 120a and the second camera 120b that has a relatively small size. In an example embodiment, the power management integrated circuit 140 may be disposed adjacent to a side surface of the substrate 110, as shown in FIGS. 7A and 7B.

FIGS. 8A, 8B, 8C and 8D are front views of a camera module according to example embodiments. Camera modules 100c, 100d, 100e and 100f of FIGS. 8A, 8B, 8C and 8D may be modified examples of the camera module 100 of FIG. 2A.

Figure 8A:
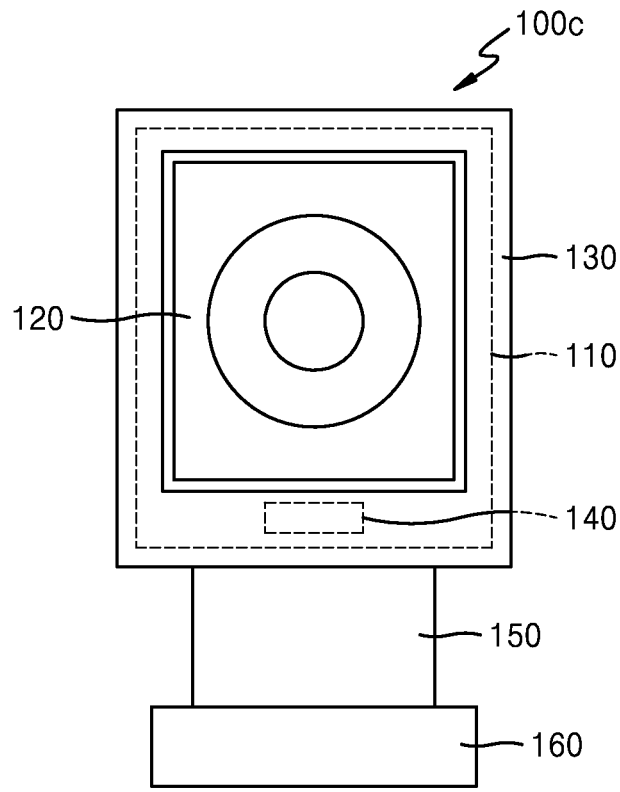
FIGS. 8A, 8B, 8C and 8D are front views of a camera module according to example embodiments.

Referring to FIG. 8A, the camera module 100c may include the substrate 110, the camera 120, the fixing member 130, the power management integrated circuit 140, the connection member 150, and the connector 160.

As shown, one camera 120 and the power management integrated circuit 140 may be disposed on the substrate 110. As described above, the TIM (of FIG. 2B) may be disposed between the power management integrated circuit 140 and the fixing member 130.

Figure 8B:
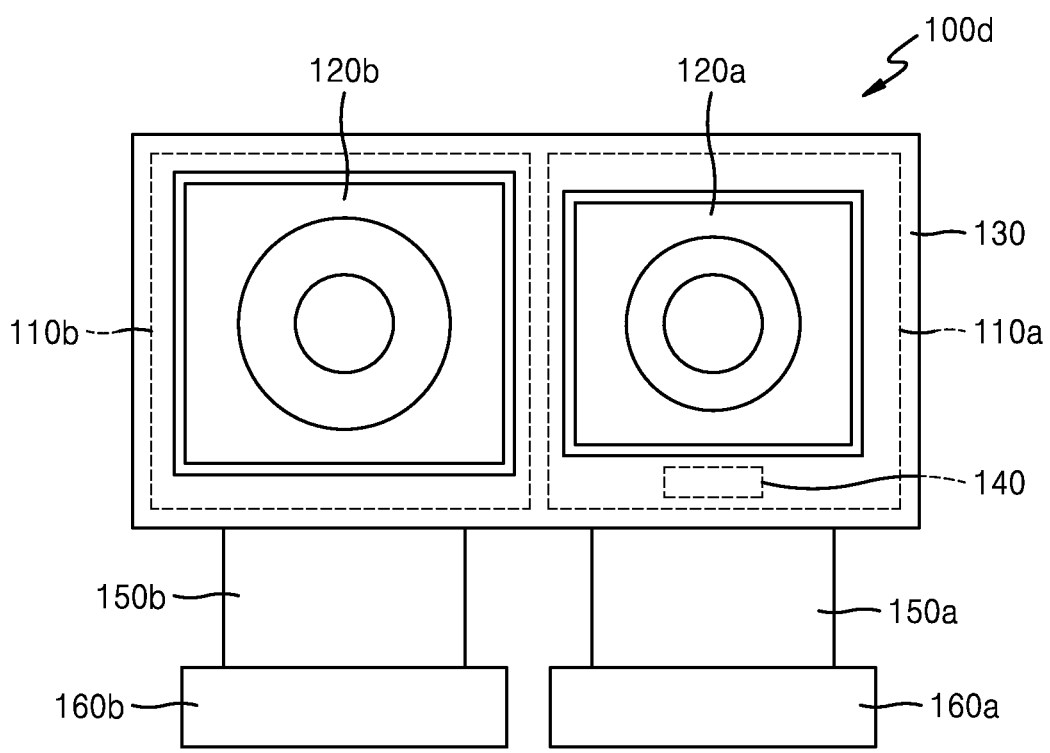

Referring to FIG. 8B, the camera module 100d may include a first substrate 110a, a second substrate 110b, the first camera 120a, the second camera 120b, the fixing member 130, the power management integrated circuit 140, a first connection member 150a, a second connection member 150b, a first connector 160a, and a second connector 160b.

The first camera 120a and the power management integrated circuit 140 may be mounted on the first substrate 110a, and the first substrate 110a may be connected to the first connector 160a through the first connection member 150a.

The second camera 120b may be mounted on the second substrate 110b, and the second substrate 110b may be connected to the second connector 160b through the second connection member 150b.

For example, the first substrate 110a, the first camera 120a, the power management integrated circuit 140, the first connection member 150a, and the first connector 160a may form a camera module unit, and the second substrate 110b, the second camera 120b, the second connection member 150b, and the second connector 160b may form another camera module unit.

The fixing member 130 may be coupled to the first camera 120a and the second camera 120b, and the TIM (of FIG. 2B) may be disposed between the power management integrated circuit 140 and the fixing member 130.

In an example embodiment, a power management integrated circuit, which is separated from the power management integrated circuit 140 mounted on the first substrate 110a, may be mounted on the second substrate 110b, and the TIM (of FIG. 2B) may be disposed between the power management integrated circuit and the fixing member 130.

Figure 8C:
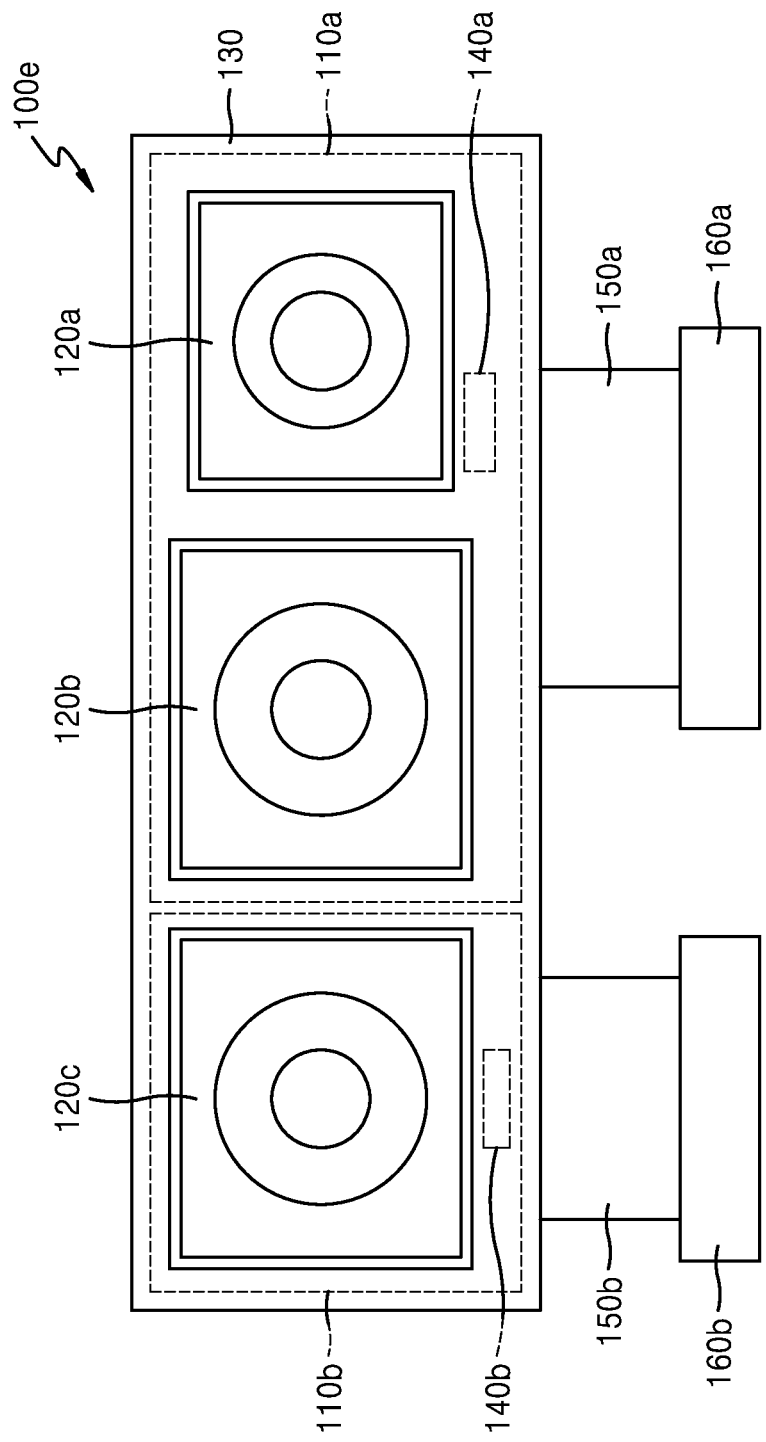

Referring to FIG. 8C, the camera module 100e may include the first substrate 110a, the second substrate 110b, the first camera 120a, the second camera 120b, a third camera 120c, the fixing member 130, a first power management integrated circuit 140a, a second power management integrated circuit 140b, the first connection member 150a, the second connection member 150b, the first connector 160a, and the second connector 160b.

The first camera 120a, the second camera 120b, and the first power management integrated circuit 140a may be mounted on the first substrate 110a, and the first substrate 110a may be connected to the first connector 160a through the first connection member 150a.

The third camera 120c may be mounted on the second substrate 110b, and the second substrate 110b may be connected to the second connector 160b through the second connection member 150b.

For example, the first substrate 110a, the first camera 120a, the second camera 120b, the first power management integrated circuit 140a, the first connection member 150a, and the first connector 160a may form a camera module unit (e.g., a multi-camera module including cameras), and the second substrate 110b, the third camera 120c, the second power management integrated circuit 140b, the second connection member 150b, and the second connector 160b may form another camera module unit (e.g., a single camera module including one camera).

The first camera 120a, the second camera 120b, and the third camera 120c may be disposed on the first substrate 110a side by side, and the fixing member 130 may be coupled to the first camera 120a, the second camera 120b, and the third camera 120c. The TIM (of FIG. 2B) may be disposed between the first power management integrated circuit 140a and the fixing member 130a (e.g., a portion of the fixing member 130a stacked on an upper portion of the first power management integrated circuit 140a), and also, the TIM may be disposed between the second power management integrated circuit 140b and the fixing member 130 (e.g., another portion of the fixing member 130a stacked on an upper portion of the second power management integrated circuit 140b).

Figure 8D:
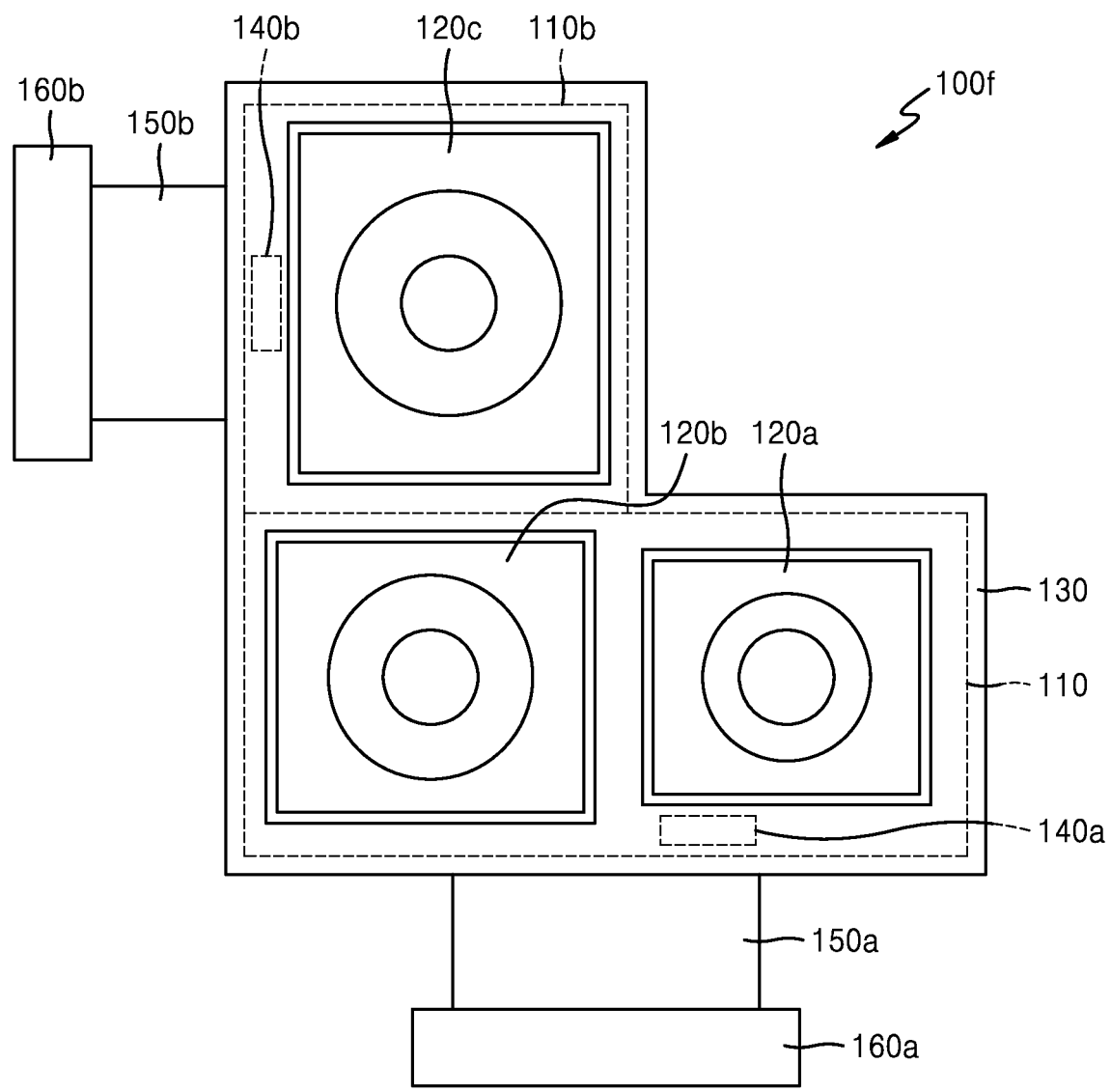

The camera module 100*f* of FIG. 8D may be a modified example of the camera module 100*e* of FIG. 8C. The first camera 120*a* and the second camera 120*b* may be disposed side by side, and as shown in the drawing, the third camera 120*c* may be disposed on the first camera 120*a* and/or the second camera 120*b*. However, example embodiments are not limited thereto and a layout of the camera module 100*f* may vary.

Figure 9A:
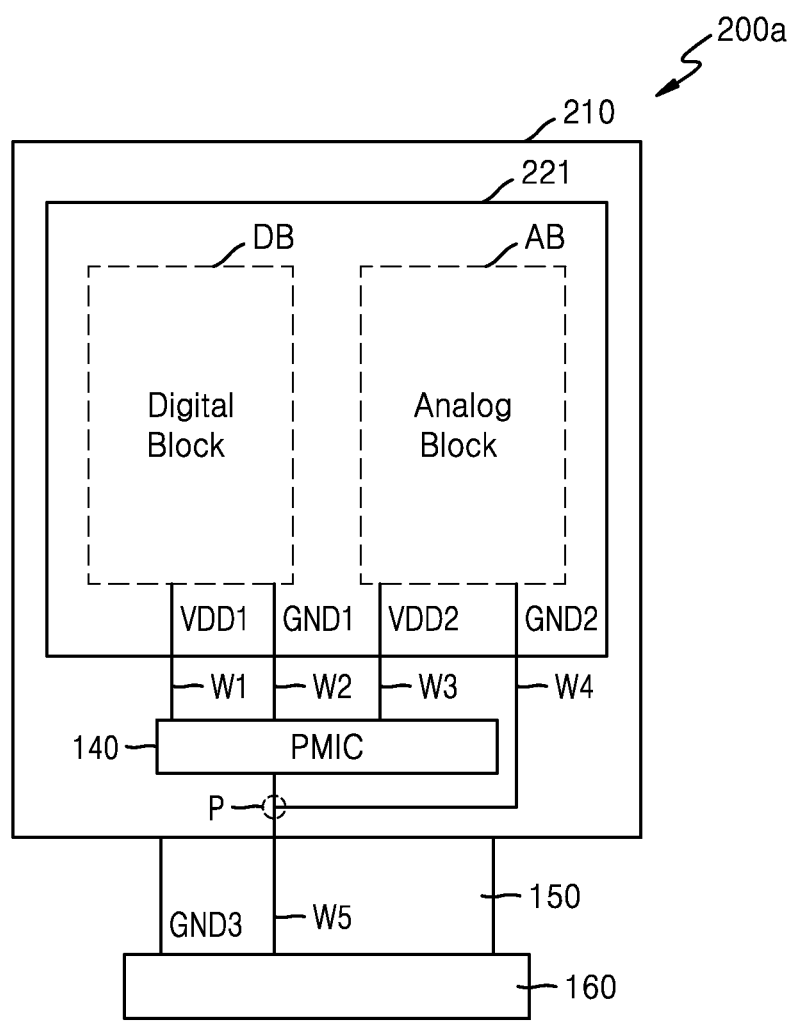
FIGS. 9A and 9B are schematic diagrams of a camera module according to example embodiments.
Figure 9B:
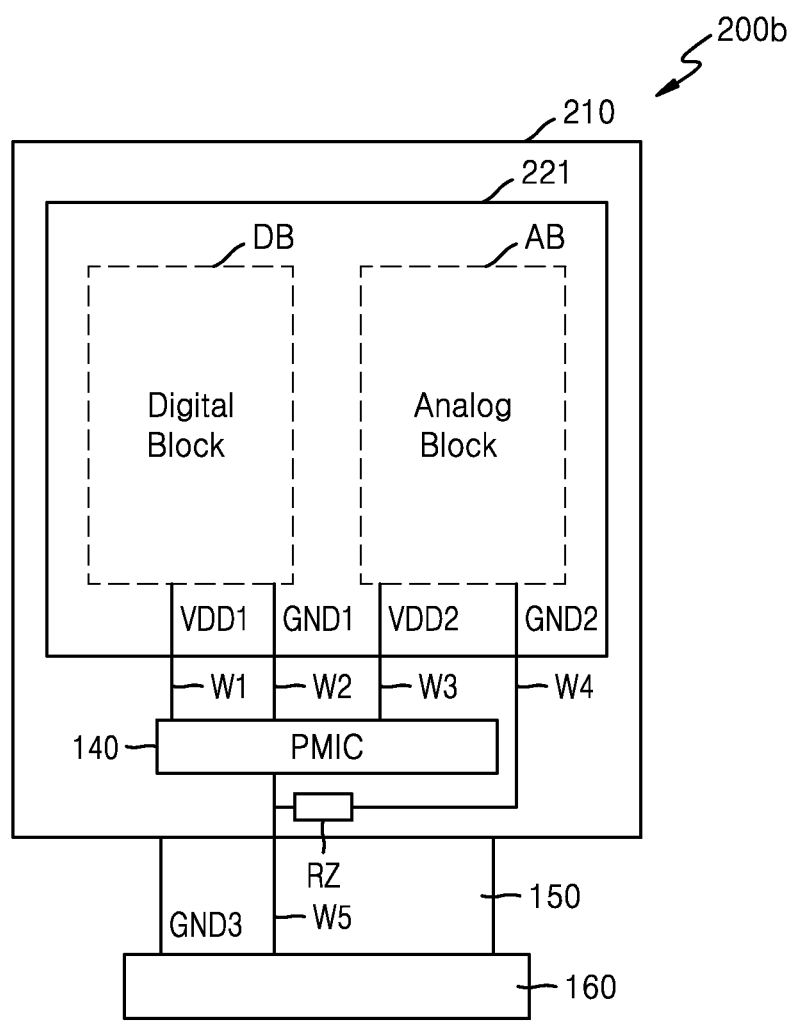

FIGS. 9A and 9B are schematic diagrams of camera modules according to example embodiments.

Referring to FIG. 9A, a camera module 200*a* may include a substrate 210, an image sensor 221, the power management integrated circuit 140, the connection member 150, and the connector 160.

The image sensor 221 may include a digital block DB and an analog block AB. For example, the digital block DB may include digital circuits, for example, a logic circuit, a data buffer, and the like, and the analog block AB may include analog circuits, for example, an amplifier, a digital-analog converter, etc., included in an image sensor.

First to fifth wires W1 to W5 may be patterned on the substrate 210. A first power voltage VDD1 and a first ground voltage GND1 may be applied to the digital block DB from the power management integrated circuit 140 through the first wire W1 and the second wire W2, respectively. For example, the first power voltage VDD1 may be a digital power voltage, the first ground voltage GND1 may be a digital ground voltage, the first wire W1 may be a digital power wire, and the second wire W2 may be a digital ground wire. The second power voltage VDD2 may be applied to the analog block AB from the power management integrated circuit 140 through the third wire W3. For example, the second power voltage VDD2 may be an analog power voltage, and the third wire W3 may be an analog power wire.

The third ground voltage GND3 may be applied to the power management integrated circuit 140 from the outside through the connector 160 and the fifth wire W5. The third ground voltage GND3 may be a reference ground voltage, and the fifth wire W5 may be a ground wire. The fourth wire W4, through which the second ground voltage GND2 (e.g., an analog ground voltage) is transmitted to the analog block AB, may be connected to one point P of the fifth wire W5. Accordingly, the third ground voltage GND3 from the outside may be applied to the analog block AB as the second ground voltage GND2 through the fifth wire W5 and the fourth wire W4.

As described, because the fourth wire W4 is connected to the point P of the fifth wire W5, the introduction of ground noise due to operation of the digital block DB or the power management integrated circuit 140 to the second ground voltage GND2 may be prevented.

A camera module 200*b* of FIG. 9B may be a modified example of the camera module 200*a* of FIG. 9A. Referring to FIG. 9B, the fourth wire W4 may be point-connected to the fifth wire W5 through a resistive element RZ having a zero resistance value. For example, the resistive element RZ may include a zero ohm resistance, zero ohm beads, and the like.

In an example embodiment, the point P of FIG. 9A or the resistive element RZ of FIG. 9B may be disposed adjacent to the power management integrated circuit 140 to decrease a path via which noise is introduced, that is, a length of the fourth wire W4.

In an example embodiment, the point P of FIG. 9A or the resistive element RZ of FIG. 9B may be disposed further from the power management integrated circuit 140. Accordingly, although the noise is introduced to the fifth wire W5 according to the operation of the power management integrated circuit 140, the introduction of noise to the fourth wire W4 may be prevented.

The second ground voltage GND2 provided to the analog block AB, that is, the noise of the analog ground voltage, may affect the quality of the images generated in the image sensor 221. When a lot of noise is introduced to the analog ground voltage, the quality of images may degrade. However, as described with reference to FIGS. 9A and 9B, in the camera modules 200*a* and 200*b* according to example embodiments, the fourth wire W4, via which the second ground voltage GND2 is provided to the analog block AB, is point-connected to the fifth wire W5, and thus, the introduction of the ground noise of the digital block DB or the power management integrated circuit 140 to the second ground voltage GND2 may be prevented. Accordingly, the quality of the images generated in the image sensor 221 may be improved.

FIGS. 9A and 9B show that the power management integrated circuit 140 provides the power voltages and the ground voltages to one image sensor 221, but example embodiments are not limited thereto. The camera modules 200*a* and 200*b* may include multiple image sensors, and the power management integrated circuit 140 may provide the power voltages and the ground voltages to each of the image sensors, respectively. In this case, as described with reference to FIGS. 9A and 9B, an analog ground voltage may be provided to each image sensor through each wire that is point-connected to a wire, for example, the fifth wire W5, through which a reference ground voltage, for example, the third ground voltage GND3, is provided to the power management integrated circuit 140 from the outside.

Figure 10:
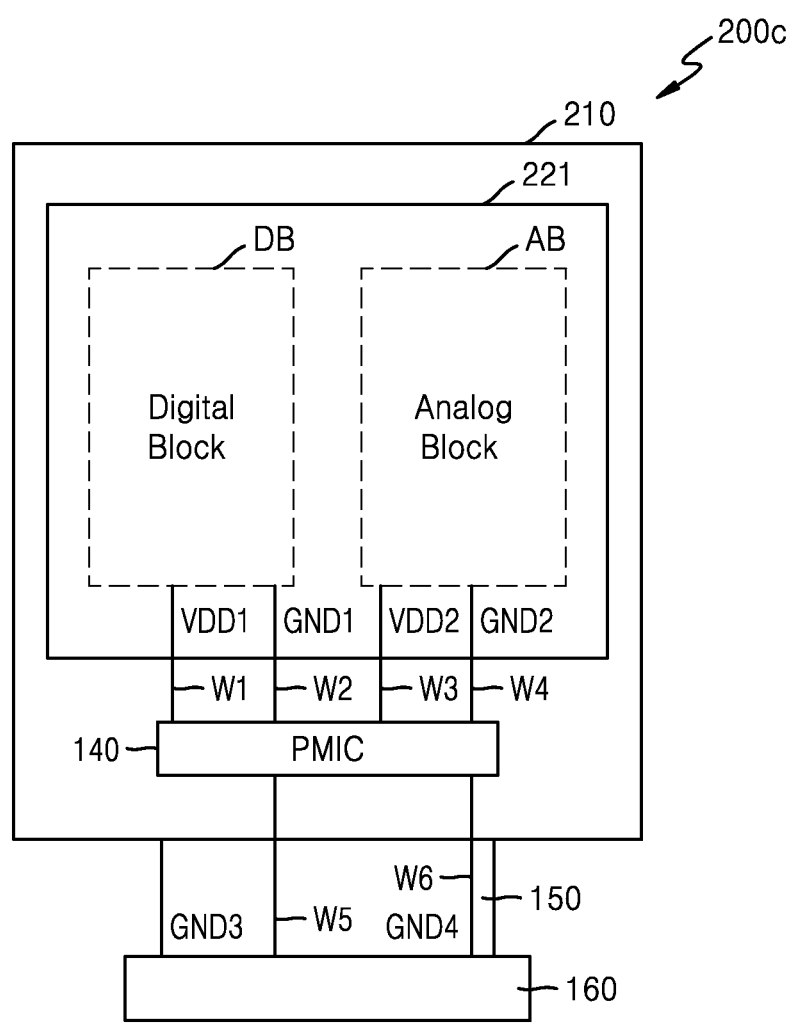
FIG. 10 is a schematic diagram of a camera module according to an example embodiment.

FIG. 10 is a schematic diagram of a camera module according to an example embodiment.

Referring to FIG. 10, a camera module 200*c* may include the substrate 210, the image sensor 221, the power management integrated circuit 140, the connection member 150, and the connector 160.

The image sensor 221 may include the digital block DB and the analog block AB. For example, the digital block DB may include digital circuits, for example, a logic circuit, a data buffer, etc., and the analog block AB may include analog circuits, for example, an amplifier, an analog-digital converter, etc., included in the image sensor.

The first to sixth wires W1 to W6 may be patterned on the substrate 210. The first power voltage VDD1 and the first ground voltage GND1 may be applied to the digital block DB from the power management integrated circuit 140 through the first wire W1 and the second wire W2, respectively. For example, the first power voltage VDD1 may be a digital power voltage, and the first ground voltage GND1 may be a digital ground voltage.

The second power voltage VDD2 and the second ground voltage GND2 may be applied to the analog block AB from the power management integrated circuit 140 through the third wire W3 and the fourth wire W4, respectively. For example, the second power voltage VDD2 may be an analog power voltage, and the third wire W3 may be an analog power wire. For example, the second power voltage VDD2 may be an analog power voltage, and the second ground voltage GND2 may be an analog ground voltage.

The third ground voltage GND3 and the fourth ground voltage GND4 may be provided from the outside through the connector 160 and may be applied to the power management integrated circuit 140 through the fifth wire W5 and the sixth wire W6, respectively. The power management integrated circuit 140 may provide the third ground voltage GND3 to the digital block DB as the first ground voltage GND1 and provide the fourth ground voltage GND4 to the analog block AB as the second ground voltage GND2.

As described, paths, via which the digital ground voltage and the analog ground voltage are provided from the outside, are separated, and thus, the introduction of noise to the analog ground voltage, for example, noise generated due to the operation of the digital block DB, may be prevented.

Figure 11:
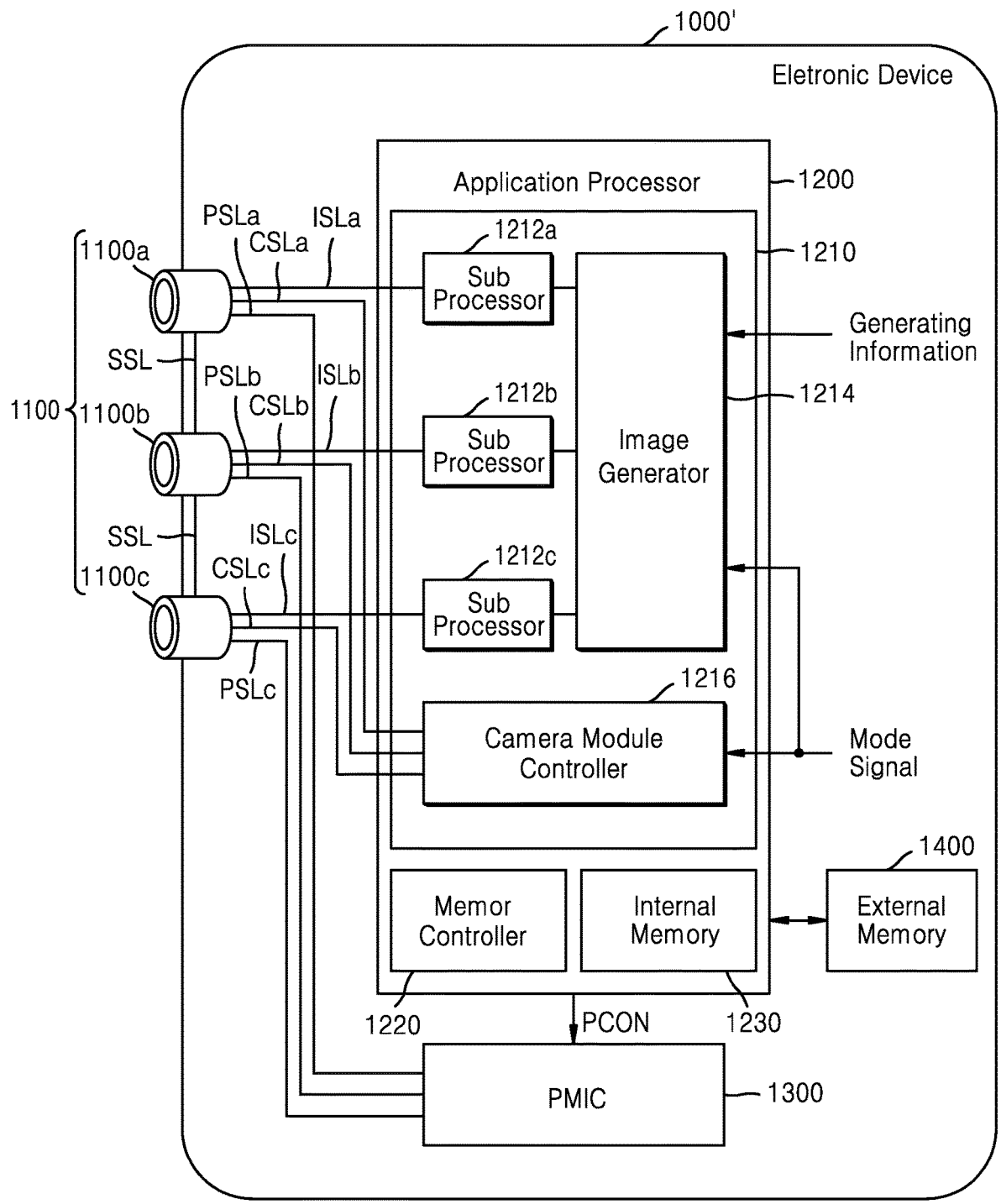
FIG. 11 is a block diagram of an electronic apparatus including a camera module, according to an example embodiment.
Figure 12:
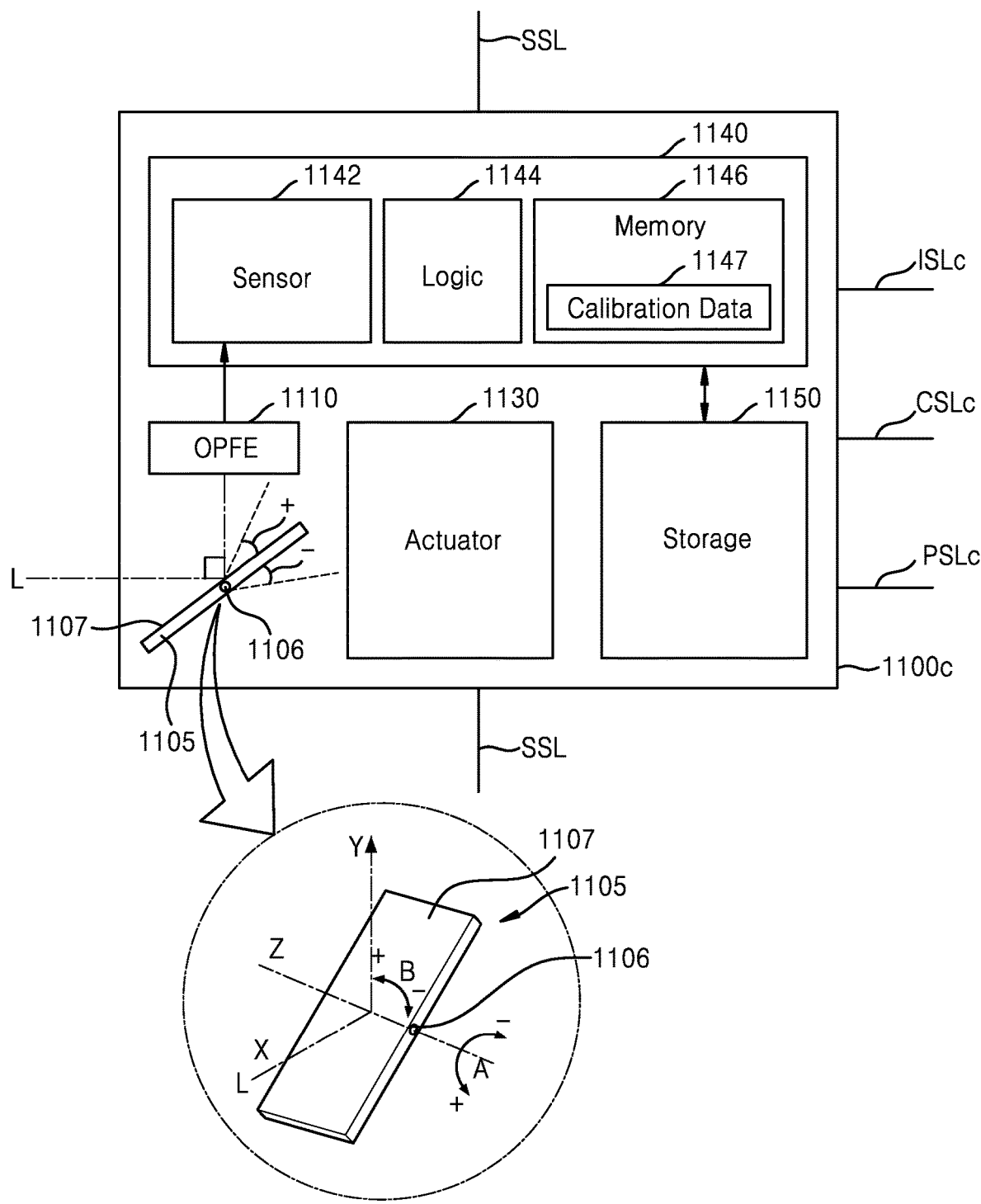
FIG. 12 is a detailed block diagram of the camera module of FIG. 11.

FIG. 11 is a block diagram of an electronic apparatus including a camera module, according to an example embodiment. FIG. 12 is a detailed block diagram of the camera module of FIG. 11.

Referring to FIG. 11, an electronic apparatus 1000' may include a camera module group 1100, an application processor 1200, a power management integrated circuit 1300, and an external memory 1400 (or storage).

The camera module group 1100 may include camera modules 1100a, 1100b, and 1100c. Although the drawings show that three camera modules 1100a, 1100b, and 1100c are arranged, example embodiments are not limited thereto. In some example embodiments, the camera module group 1100 may be modified to include only two camera modules. Also, in some example embodiments, the camera module group 1100 may be modified to include n camera modules (where, n is a natural number equal to or greater than 4).

Each of the camera modules 1100a, 1100b, and 1100c may include a camera (or an image sensing apparatus), and the camera may include a lens and an image sensor.

A camera module according to the example embodiments described with reference to FIGS. 1A to 10 may be applied as at least one of the camera modules 1100a, 1100b, and 1100c. For example, the camera module 1100a may include a power management integrated circuit. In other words, an image sensor and a power management integrated circuit may be mounted on a substrate of the camera module 1100a. In an example embodiment, the camera module 1100a may be realized as a multi-camera module on which a first camera and a second camera are mounted on one substrate, and on the substrate, the power management integrated circuit for generating voltages used in the first camera and the second camera may be mounted.

The fixing member 130 (of FIGS. 1A to 2B) may be coupled to cameras included in the camera modules 1100a, 1100b, and 1100c, and the TIM (of FIG. 2B) may be disposed between the power management integrated circuit and the fixing member of the camera module 1100a.

In an example embodiment, one of the camera modules 1100a, 1100b, and 1100c, for example, the camera module 1100c, may include an Optical Path Folding Element (OPFE) (1110 of FIG. 12). Other camera modules (e.g., the camera modules 1100a and 1100b) may be vertical camera modules that do not include OPFEs, but example embodiments are not limited thereto.

Referring to FIG. 12, a detailed structure of the camera module 1100c will be described in detail.

Referring to FIG. 12, the camera module 1100c may include a prism 1105, the OPFE 1110, an actuator 1130, an image sensing apparatus 1140, and a storage 1150.

The prism 1105 may include a reflection surface 1107 including a light reflection material and may change a path of light L incident from the outside.

In an example embodiment, the prism 1105 may change the path of the light L, which is incident thereon. For example, the prism 1105 may change the path of the light L from a first direction X to a second direction Y perpendicular to the first direction X. Also, the prism 1105 may rotate, in an A direction, the reflection surface 1107 of the light reflection material on a central axis 1106 or may rotate the central axis 1106 in a B direction, thereby changing the path of the light L, which is incident in the first direction X, to be in the second direction Y perpendicular to the first direction X. The OPFE 1110 may also be moved in a third direction Z that is perpendicular to the first direction X and the second direction Y.

In an example embodiment, as shown in FIG. 12, a maximum degree of rotation of the prism 1105 may be less than or equal to 15 degrees in a +A direction and may be greater than 15 degrees a −A direction. However, example embodiments are not limited thereto.

In an example embodiment, the prism 1105 may be moved in a range of about 20 degrees, between about 10 degrees and about 20 degrees, or between about 15 degrees and about 20 degrees in a +B or −B direction.

In an example embodiment, the prism 1105 may move the reflection surface 1107 of the light reflection material in the third direction (e.g., the Z direction) parallel to an extension direction of the central axis 1106.

The OPFE 1110 may include, for example, an optical lens group including m lenses (where, m is a natural number). The m lenses may be moved in the second direction Y and may change an optical zoom ratio of the camera module 1100b. For example, when a basic optical zoom ratio of the camera module 1100b is Z, and when m optical lenses included in the OPFE 1110 are moved, an optical zoom ratio of the camera module 1100b may be changed to 3Z, 5Z, or more.

The actuator 1130 may move the OPFE 1110 or the optical lens (hereinafter, referred to as the optical lens) to a certain location. For example, the actuator 1130 may adjust a location of the optical lens to allow an image sensor 1142 to be in a focal length of the optical lens for accurate sensing.

The image sensing apparatus 1140 may include the image sensor 1142, a control logic 1144, and a memory 1146. The image sensor 1142 may generate image data, corresponding to an image of a sensing target, by using the light L provided through the optical lens.

The control logic 1144 may control all operations of the third camera module 1100c. For example, the control logic 1144 may control the operation of the camera module 1100b in response to a control signal provided through a control signal line CSLc.

The memory 1146 may store information, for example, calibration data 1147, which is required to operate the third camera module 1100c. The calibration data 1147 may include information that the third camera module 1100c requires to generate image data by using the light L provided from the outside. The calibration data 1147 may include, for example, information regarding the above-described degree of rotation, information regarding the focal length, information regarding the optical axis, and the like. When the camera module 1100b is a multi-state camera of which a focal length changes according to a location of the optical lens, the calibration data 1147 may include a focal length value and information regarding auto-focusing at each location (or each state) of the optical lens.

The storage 1150 may store the image data that is generated by the image sensor 1142. The storage 1150 may be disposed outside the image sensing apparatus 1140 and may be stacked with a sensor chip forming the image sensing apparatus 1140. In some example embodiments, the storage 1150 may be realized as an Electrically Erasable Programmable Read-Only Memory (EEPROM), but example embodiments are not limited thereto.

Referring to FIGS. 11 and 12, in an example embodiment, the camera modules 1100a, 1100b, and 1100c may each include the actuator 1130. Accordingly, each of the camera modules 1100a, 1100b, and 1100c may include identical or different pieces of the calibration data 1147 according to operation of the actuator 1130 included in each of the camera modules 1100a, 1100b, and 1100c.

Referring back to FIG. 11, one of the camera modules 1100a, 1100b, and 1100c (e.g., the camera module 1100a) may be, for example, a depth camera of a vertical type used to extract depth information by using IR light. In this case, the application processor 1200 may merge the image data received from the depth camera with image data provided from another camera module (e.g., the camera module 1100b or 1100c) such that a 3D depth image may be generated.

In an example embodiment, at least two of the camera modules 1100a, 1100b, and 1100c (e.g., the camera modules 1100a and 1100b) may have different fields of view (viewing angles). In this case, for example, at least two of the camera modules 1100a, 1100b, and 1100c (e.g., the camera modules 1100a and 1100b) may have different optical lenses, but example embodiments are not limited thereto.

Also, in an example embodiment, the camera modules 1100a, 1100b, and 1100c may have different viewing angles. In this case, the camera modules 1100a, 1100b, and 1100c may have different optical lenses, but example embodiments are not limited thereto.

In an example embodiment, the camera modules 1100a, 1100b, and 1100c may be physically separated from each other. That is, the camera modules 1100a, 1100b, and 1100c do not divide and share a sensing area of one image sensor 1142, but may respectively include the image sensors 1142.

The application processor 1200 may include an image processor 1210, a memory controller 1220, and an internal memory 1230. The application processor 1200 may be separated from the camera modules 1100a, 1100b, and 1100c. For example, the application processor 1200 and the camera modules 1100a, 1100b, and 1100c may be realized as separate semiconductor chips.

The image processor 1210 may include sub-image processors 1212a, 1212b, and 1212c, an image generator 1214, and a camera module controller 1216.

The number of sub-image processors 1212a, 1212b, and 1212c may correspond to the number of camera modules 1100a, 1100b, and 1100c.

Image data generated by each of the camera modules 1100a, 1100b, and 1100c may be provided to the corresponding sub-image processors 1212a, 1212b, and 1212c through image signal lines ISLa, ISLb, and ISLc that are separated from each other. For example, the image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. The image data transmission may be performed by using, for example, a Camera Serial Interface (CSI) based on a Mobile Industry Processor Interface (MIPI), but example embodiments are not limited thereto.

In an example embodiment, one sub-image processor may be provided for multiple camera modules. For example, the sub-image processor 1212a and the sub-image processor 1212c may be integrally formed into one sub-image processor. The image data provided from the camera modules 1100a and 1100c may be selected by a selection device (e.g., a multiplexer), etc., and then provided to the integrated sub-image processor.

The image data provided to each of the sub-image processors 1212a, 1212b, and 1212c may be provided to the image generator 1214. The image generator 1214 may generate an output image by using the image data provided from each of the sub-image processors 1212a, 1212b, and 1212c, according to image generating information or a mode signal.

In detail, the image generator 1214 may merge at least some pieces of the image data generated by the camera modules 1100a, 1100b, and 1100c having different viewing angles according to the image generating information or the mode signal and then may generate an output image. Also, the image generator 1214 may select image data generated from one of the camera modules 1100a, 1100b, and 1100c having different viewing angles according to the image generating information or the mode signal and thus may generate the output images.

In an example embodiment, the image generating information may include a zoom signal or a zoom factor. Also, in an example embodiment, the mode signal may be, for example, a signal based on a mode selected by a user.

When the image generating information includes a zoom signal (a zoom factor) and the camera modules 1100a, 1100b, and 1100c have different fields of view (viewing angles), the image generator 1214 may perform different operations according to types of zoom signals. For example, when the zoom signal is a first signal, after the image data output from the camera module 1100a is merged with the image data output from the camera module 1100c, an output image may be generated by using the merged image data, and the image data output from the camera module 1100b may not be used during the above data merging. When the zoom signal is a second signal different from the first signal, the image generator 1214 may select any image data output from one of the camera modules 1100a, 1100b, and 1100c instead of performing the image data merging, and may generate an output image. However, example embodiments are not limited thereto, and according to necessity, a method of processing image data may vary.

In an example embodiment, the image generator 1214 may receive multiple pieces of image data having different exposure times from at least one of the sub-image processors 1212a, 1212b, and 1212c and may perform high dynamic range (HDR) processing on the pieces of the image data, thereby generating the merged image data of which a dynamic range is increased.

The camera module controller 1216 may provide control signals to the camera modules 1100a, 1100b, and 1100c, respectively. The control signals generated from the camera module controller 1216 may be provided to corresponding camera modules 1100a, 1100b, and 1100c through the control signal lines CSLa, CSLb, and CSLc that are separated from each other.

Any one of the camera modules 1100a, 1100b, and 1100c (e.g., the camera module 1100b) may be designated as a master camera according to the image generating information including a zoom signal or to the mode signal, and others of the camera modules 1100a, 1100b, and 1100c (e.g., the camera modules 1100a and 1100c) may be designated as slave cameras. Such information may be included in the control signal and may be provided to the corresponding camera modules 1100a, 1100b, and 1100c through the control signal lines CSLa, CSLb, and CSLc that are separated from each other.

According to a zoom factor or an operation mode signal, camera modules functioning as master and slave cameras may change. For example, when the viewing angle of the camera module 1100a is greater than that of the camera module 1100b and the zoom factor indicates a low zoom ratio, the camera module 1100b may function as a master, and the camera module 1100a may function as a slave. On the contrary, when the zoom factor indicates a high zoom ratio, the camera module 1100a may function as a master, and the camera module 1100b may function as a slave.

In an example embodiment, the control signal provided to each of the camera modules 1100a, 1100b, and 1100c from the camera module controller 1216 may include a sync enable signal. For example, when the camera module 1100b is a master camera and the camera modules 1100a and 1100c are slave cameras, the camera module controller 1216 may transmit the sync enable signal to the camera module 1100b. The camera module 1100b receiving the sync enable signal may generate a sync signal in response to the received sync enable signal and may provide the generated sync signal to the camera modules 1100a and 1100c through a sync signal line SSL. The camera module 1100b and the camera modules 1100a and 1100c may transmit the image data to the application processor 1200 in synchronization with the sync signal.

In an example embodiment, the control signals provided to the camera modules 1100a, 1100b, and 1100c from the camera module controller 1216 may include mode information according to a mode signal. Based on the mode information, the camera modules 1100a, 1100b, and 1100c may operate in a first operation mode or a second operation mode with regard to sensing speed.

In the first operation mode, the camera modules 1100a, 1100b, and 1100c may generate an image signal at a first speed (e.g., generate an image signal of a first frame rate), encode the image signal at a second speed that is greater than the first speed (e.g., encode the image signal of a second frame rate that is greater than the first frame rate), and transmit the encoded image signal to the application processor 1200. In this case, the second speed may be, for example, less than or equal to 30 times the first speed.

The application processor 1200 may store the received image signal, the encoded image signal, in the internal memory 1230 provided in the application processor 1200 or an external memory 1400 outside the application processor 1200. Then, the application processor 1200 may read the encoded image signal from the internal memory 1230 or the external memory 1400 to decode the same and may display image data generated according to the decoded image signal. For example, a corresponding one of the sub-image processors 1212a, 1212b, and 1212c of the image processor 1210 may perform decoding and also image processing on the decoded image signal.

In the second operation mode, the camera modules 1100a, 1100b, and 1100c may generate an image signal at a third speed that is less than the first speed (e.g., generate an image signal of a third frame rate that is less than the first frame rate) and may transmit the image signal to the application processor 1200. The image signal provided to the application processor 1200 may be a signal that is not encoded. The application processor 1200 may perform image processing on a received image signal or may store an image signal in the internal memory 1230 or the external memory 1400.

The power management integrated circuit 1300 may supply power, for example, a power voltage, to each of the camera modules 1100a, 1100b, and 1100c. For example, under the control of the application processor 1200, the power management integrated circuit 1300 may supply first power to the camera module 1100a through a power signal line PSLa, supply second power to the camera module 1100b through a power signal line PSLb, and supply third power to the camera module 1100c through a power signal line PSLc. As described above, the camera module 1100c may include therein a power management integrated circuit, and the power management integrated circuit may generate power voltages according to the power voltage provided from the power management integrated circuit 1300.

In response to a power control signal PCON from the application processor 1200, the power management integrated circuit 1300 may generate power corresponding to each of the camera modules 1100a, 1100b, and 1100c and may adjust a power level. The power control signal PCON may include a power adjustment signal for an operation mode of each of the camera modules 1100a, 1100b, and 1100c. For example, the operation mode may include a low power mode, and in this case, the power control signal PCON may include information regarding a camera module operating in a low power mode and a set power level. The power levels of the camera modules 1100a, 1100b, and 1100c may be identical to or different from each other. Also, the power levels may dynamically change.

While aspects of example embodiments have been particularly shown and described, it will be understood that various changes in form and details may be made therein without departing from the spirit and scope of the following claims.

What is claimed is:

1. A camera module comprising:
   a substrate;
   a first camera disposed on the substrate and configured to generate a first image based on a first optical signal;
   a second camera disposed on the substrate and configured to generate a second image based on a second optical signal;
   a power management integrated circuit disposed on the substrate, and configured to generate a plurality of voltages based on an external power voltage received from an external power supply and provide the plurality of voltages to the first camera and the second camera;
   a metal fixing member coupled to the first camera and the second camera; and
   a thermal interface material disposed between the power management integrated circuit and the metal fixing member along a direction perpendicular to an upper surface of the substrate.

2. The camera module of claim 1, wherein the thermal interface material directly contacts the power management integrated circuit and the metal fixing member.

3. The camera module of claim 1, wherein a size of the first camera is less than a size of the second camera, and
   wherein the power management integrated circuit is disposed on the substrate adjacent to the first camera.

4. The camera module of claim 1, wherein the power management integrated circuit is disposed on the substrate between the first camera and the second camera.

5. The camera module of claim 1, wherein the power management integrated circuit is disposed inside a shield can, and the thermal interface material is disposed on and directly contacts the shield can.

6. The camera module of claim 1, wherein the first camera comprises:
   a first lens configured to collect the first optical signal; and
   a first image sensor configured to convert the first optical signal into a first image signal, wherein the second camera comprises:
a second lens configured to collect the second optical signal; and
a second image sensor configured to convert the second optical signal into a second image signal, and
wherein either one or any combination of the first camera and the second camera further comprises an actuator configured to move a corresponding lens.

7. The camera module of claim 6, further comprising a connector electrically connected to the substrate and configured to receive the external power voltage from the external power supply.

8. The camera module of claim 7, further comprising a radiation film attached to a lower surface of the substrate and a lower surface of the connector.

9. The camera module of claim 8, wherein the substrate comprises:
a reference ground wire formed between the power management integrated circuit and the connector;
a first ground wire formed between the first image sensor and the power management integrated circuit;
a second ground wire extending from the first image sensor and connected to a point of the reference ground wire;
a third ground wire formed between the second image sensor and the power management integrated circuit; and
a fourth ground wire extending from the second image sensor and connected to the point of the reference ground wire.

10. The camera module of claim 9, wherein the second ground wire is connected to the reference ground wire through a resistive element having a zero ohm resistance.

11. A camera module comprising:
a first substrate;
a first camera disposed on the first substrate and configured to generate a first image based on a first optical signal;
a first power management integrated circuit disposed on the first substrate, and configured to generate a first power voltage based on a first external power voltage received from an external power supply and provide the first power voltage to the first camera;
a metal fixing member coupled to the first camera; and
a first thermal interface material disposed between the first power management integrated circuit and the metal fixing member along a direction perpendicular to an upper surface of the first substrate.

12. The camera module of claim 11, further comprising:
a connector configured to receive the external power supply; and
a connection member connected between the connector and the first substrate; and
a radiation film attached to a lower surface of the first substrate and a lower surface of the connector and extending from the lower surface of the first substrate to the lower surface of the connector.

13. The camera module of claim 11, further comprising a second camera disposed on the first substrate and configured to generate a second image based on a second optical signal,
wherein the metal fixing member is coupled to the first camera and the second camera.

14. The camera module of claim 13, further comprising:
a second substrate which is separated from the first substrate; and
a third camera disposed on the second substrate, and configured to generate a third image based on a third optical signal,
wherein the metal fixing member is coupled to the first camera, the second camera, and the third camera.

15. The camera module of claim 11, further comprising:
a second substrate which is separated from the first substrate; and
a second camera disposed on the second substrate, and configured to generate a second image based on a second optical signal,
wherein the metal fixing member is coupled to the first camera and the second camera.

16. An imaging apparatus comprising:
a first camera module configured to generate a first image;
a power supply configured to provide a power voltage to the first camera module; and
a processor configured to receive the first image from the first camera module,
wherein the first camera module comprises:
a substrate;
a first camera disposed on the substrate and comprising a first lens and a first image sensor;
a connector electrically connected to the substrate and configured to receive the power voltage from the power supply and transmit the first image to the processor;
a power management integrated circuit disposed on the substrate, and configured to generate a plurality of voltages based on the power voltage and provide the plurality of voltages to the first image sensor;
a metal frame surrounding and coupled to the first camera; and
a thermal interface material disposed between the power management integrated circuit and the metal frame along a direction perpendicular to an upper surface of the substrate.

17. The imaging apparatus of claim 16, wherein the metal frame is configured to couple the first camera module to a main substrate of the imaging apparatus.

18. The imaging apparatus of claim 16, wherein the thermal interface material directly contacts the power management integrated circuit and the metal frame.

19. The imaging apparatus of claim 16, wherein the first camera module comprises a plurality of cameras, each of which is disposed on the substrate, and comprises a lens and an image sensor.

20. The imaging apparatus of claim 16, further comprising:
an optical path folding element configured to change a path of an optical signal;
a second lens configured to collect a refracted optical signal that is refracted by the optical path folding element; and
a second camera module comprising a second image sensor configured to receive the collected optical signal.

* * * * *